United States Patent [19]

Mohr

[11] Patent Number: 4,514,979

[45] Date of Patent: May 7, 1985

[54] HOT-GAS PISTON TYPE ENGINE

[75] Inventor: Ernst Mohr, Murten, Switzerland

[73] Assignee: Fides Treuhand GmbH, Wuppertal, Fed. Rep. of Germany

[21] Appl. No.: 341,755

[22] Filed: Jan. 22, 1982

[30] Foreign Application Priority Data

Jan. 27, 1981 [EP] European Pat. Off. .............. 81810022

[51] Int. Cl.³ .............................................. F01B 29/00
[52] U.S. Cl. ....................................... 60/512; 60/648; 62/6
[58] Field of Search .................. 60/512, 517, 650, 669, 60/682, 516, 525, 648; 62/6; 237/1 R, 11; 417/243

[56] References Cited

U.S. PATENT DOCUMENTS

| | | | |
|---|---|---|---|
| 668,540 | 2/1901 | Ostergren | 62/6 X |
| 1,535,848 | 4/1925 | Nicholson | 62/6 X |
| 3,029,596 | 4/1962 | Hanold et al. | 60/524 |
| 4,183,213 | 1/1980 | Rao | 60/517 |
| 4,242,878 | 1/1981 | Brinkerhoff | 417/243 X |
| 4,270,351 | 6/1981 | Kuhns | 60/517 |

FOREIGN PATENT DOCUMENTS

| | | |
|---|---|---|
| 1501585 | 10/1969 | Fed. Rep. of Germany . |
| 1801971 | 6/1970 | Fed. Rep. of Germany . |
| 2525911 | 2/1976 | Fed. Rep. of Germany . |
| 2433947 | 2/1976 | Fed. Rep. of Germany . |
| 2826603 | 5/1979 | Fed. Rep. of Germany . |
| 2066543 | 7/1971 | France . |
| 2084240 | 11/1971 | France . |

*Primary Examiner*—Stephen F. Husar
*Attorney, Agent, or Firm*—Wender Murase & White

[57] ABSTRACT

An intermediate circuit is connected between the compression space acting as a first heat exchanger of the cylinder of a heat pump or a working machine and the water for industrial use or the burning space of an oil burner, the intermediate circulator comprising a second heat exchanger protruding within the water for industrial use.

Through the utilization of an intermediate circulator with a gaseous or liquid auxiliary medium is possible to adapt the transfer of heat between the cylinder of the machine and the heat medium to the respective conditions which permits to increase the total efficiency.

11 Claims, 14 Drawing Figures 4,514,979

HOT-GAS PISTON TYPE ENGINE

BACKGROUND OF THE INVENTION

The present invention relates to a hot-gas piston type engine having a heat exchanger constructed to act as a compression space of a cylinder of said engine.

Such a hot-gas piston type engine and its utilization for heat plants, refrigerating plants and power plants is described in the co-pending U.S. application Ser. No. 275,787, now U.S. Pat. No. 4,435,959, issued Mar. 13, 1984. The heat exchanger consists e.g. of a plurality of adequatly arranged small pipes or ribs which are in direct contact on the one hand with the gas in the compression space and on the other hand either with the burning space of an oil or gas burner in the case of a driving machine or with the medium to be heated, like water, in the case of a heat pump. It is obvious that the configuration of the compression space and the type of the heat transfer are particularly important for the power and the efficiency of the plant. It is therefore an object of the present invention to improve the heat transfer between the gas in the compression space and the heat medium in the burning space or in the heat plant in order to increase the efficiency and the power of a hot-gas piston type engine as mentioned above.

SUMMARY OF THE INVENTION

According to the present invention an intermediate circuit with an auxiliary medium and a second heat exchanger is connected between a heat medium and said compression space acting as a first heat exchanger.

The invention will be described further by way of example, with reference to the accompanying drawings.

BRIEF DESCRIPTION OF THE DRAWINGS

The following drawings are schematic representations only.

DETAILED DESCRIPTION OF THE INVENTION

The following executions are described in relation with a heat pump plant as an example but it is clear that the following described heat transfer systems are also valid for other plants with hot-gas piston type engines.

As more precisely described in the above mentioned co-pending U.S. patent application, the air is compressed into the cylinder of the heat pump by means of a piston and consequently warmed up. In the upper dead center, the hot compressed air must deliver heat to the heat medium, for example heating water, circulating oil, hot air and the like. Part of the compressing work is recovered in the expansion stroke. In order to achieve an efficiency as high as possible of the heat pump it is necessary to deliver a part as great as possible of the produced heat to the heat medium. In order to increase the efficiency of this heat transfer it is proposed to provide an intermediary carrier which in the following will be called auxiliary medium.

The following relation has a general validity: $Q = \alpha \times F \times \Delta t$, where Q is the transferred quantity of heat, $\alpha$ the coefficient of thermal conduction and $\Delta t$ the mean temperature difference between the compressed air and the heat medium. As indicated above, Q must be as great as possible in order for the power of each stroke of the piston of the heat pump to become as great as possible, $\alpha$ must be as great as possible, this coefficient depending from the material of the heat exchanger and from the type, the condition of aggregation and the streaming speed of the mediums, F must be as great as possible whereas it follows from physical and thermodynamical considerations that $\Delta t$ must be as low as possible in order to achieve a great thermodynamical efficiency.

Figure 1:
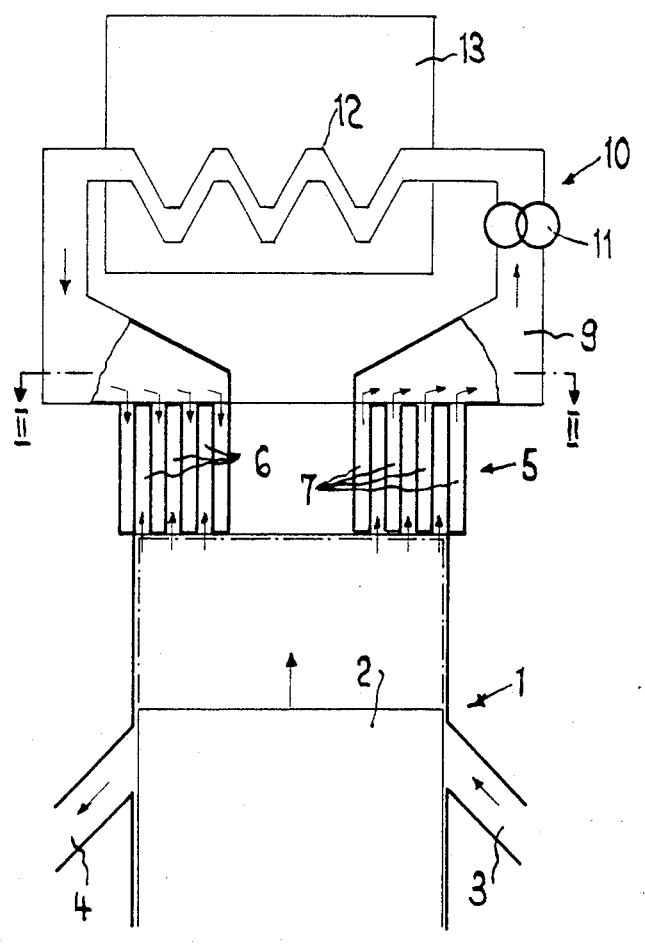
FIG. 1 shows a section of a first embodiment of a heat transfer system of a hot-gas piston type engine according to the invention.
Figure 2:
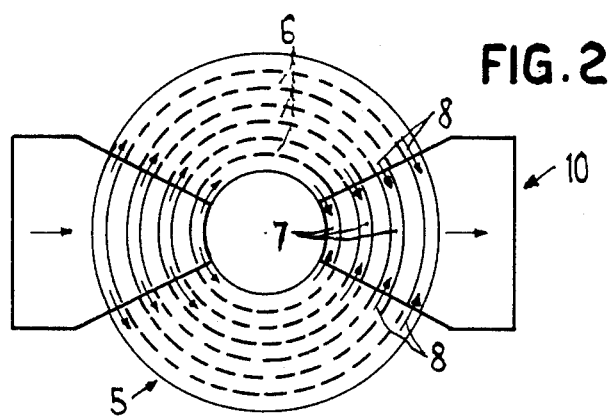
FIG. 2 shows a section along the line II—II of FIG. 1.

The heat transfer from the compression space into the heat medium or the other way round will only take place at the time in which the piston is in the domain of the upper dead center. In the case of a direct heat transfer from the compression space in to the heat medium or the other way round, optimization of the heat transfer may take place only with respect to the configuration of the compression space and the material thereof because as a rule the heat medium as well as the streaming speed are already predetermined. Due to the interconnection of an auxiliary medium as proposed by the present invention it becomes possible to optimize the heat transfer by the configuration of the compression space acting as a first heat exchanger as well as by the choice of the auxiliary medium. In principle, the auxiliary medium may be a liquid or a gas and it may be set into circulation by means of aggregates like for example a rotary pump. If the auxiliary medium is a gas, the latter may be compressed. If the auxiliary medium is brought to a pressure which lies between the air ambient pressure and the final compression pressure, the heat exchanging system is relieved from the pressure and in the case where the auxiliary medium is a gas, the heat transfer is improved and Q is increased. In the case where the auxiliary medium is not compressible, the pressure in the cylinder of the hot-gas piston type engine may be applied to the closed loop system of the auxiliary medium which gives a full pressure compensation. This permits to utilize thin metal sheets for the heat exchanger. In FIGS. 1 and 2 is described a first embodiment of a heat transfer system with a compression space and a heat medium, utilizing an auxiliary medium. One recognizes the cylinder 1 of a heat pump with the piston 2, the inlet 3 and the outlet 4 of the cylinder as well as the compression space 5 acting as a first heat exchanger. The compression space 5 consists of annular capillary chambers 6 and 7 which are closed at the top, respectively at the bottom. It is obvious that only such auxiliary mediums may be used which do not attack the exchanger. As indicated by the arrows 8 in FIG. 2, the auxiliary medium enters on the left hand side into the open annular chamber 7, travels then through this chamber in both directions and takes up the heat from the compressed air and comes out with a corresponding higher temperature on the right hand side of the chamber. The auxiliary medium 9 which in the present case is a gas, a compressed gas or a liquid is set in circulation in the intermediate circuit 10 by a circulation pump 11 and it travels through a second heat exchanger 12 in which the heat is transfered into the heat medium 13. The surface of the first heat exchanger is very great. For 1 l of the cylinder capacity it is possible to realize a surface F between 1 and more than 10 m² which permits even in the case of small values of Δt to deliver a great quantity of heat Q to the auxiliary medium with a good efficiency.

As mentioned above, it is possible to utilize thin metal sheets for the first heat exchanger when the auxiliary medium is a non compressible liquid. It is useful in such a case and in accordance with FIG. 3 to utilize metal sheets rings 14 which have individual impressed bosses 15 respectively cavities and which reciprocally support each other. As indicated by the arrows 16, the air from the cylinder of the heat pump enters from the bottom while the auxiliary medium 9 enters from the top. The rings of metal sheet may consist of aluminium, brass, steel sheet and the like.

Figure 3:
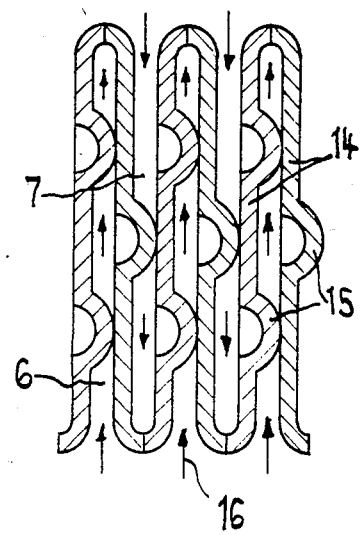
FIG. 3 shows an enlarged part of FIG. 1.
Figure 4:
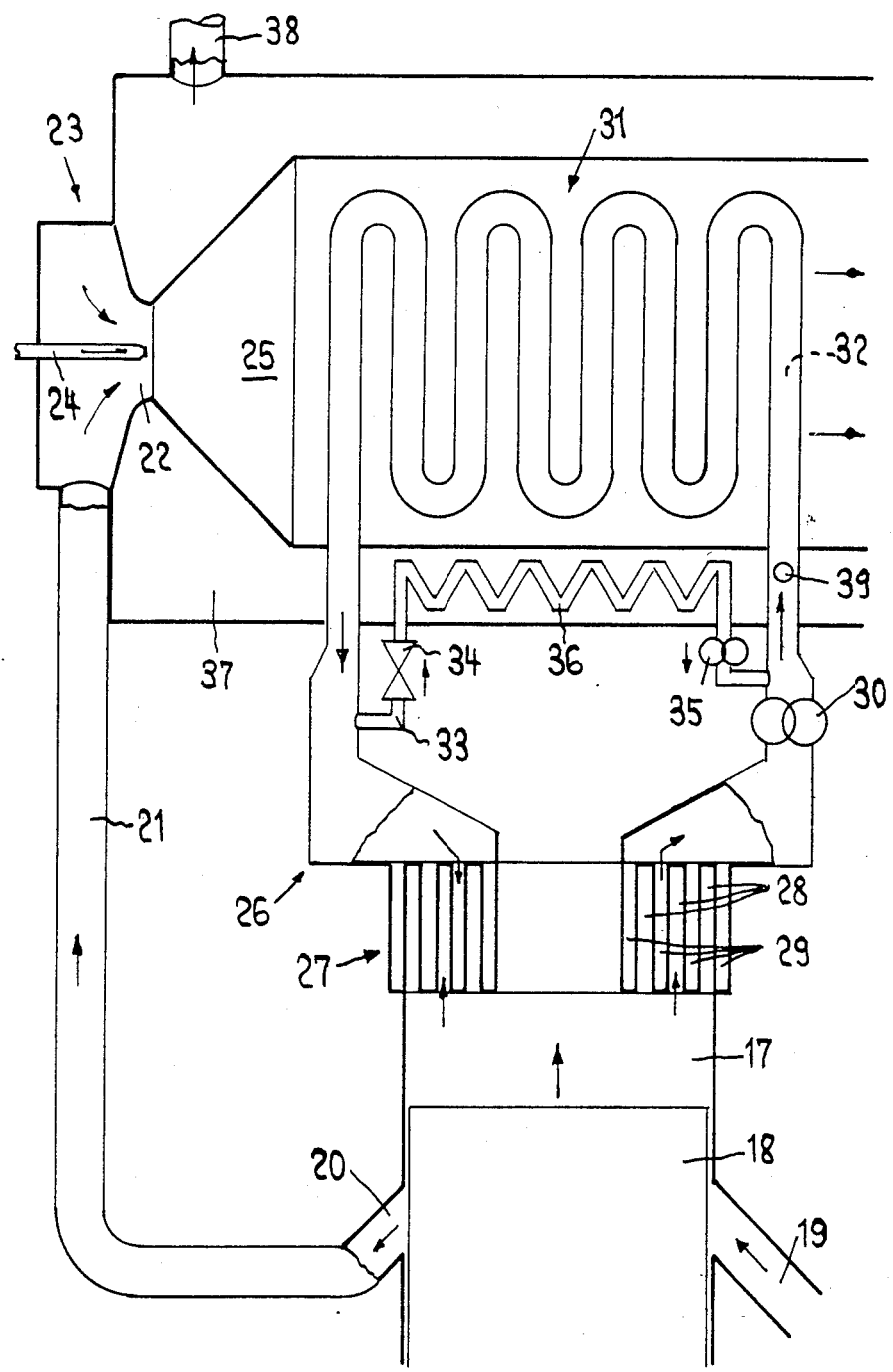
FIG. 4 shows a variant of the embodiment of FIG. 1.

The heat transfer system according to FIG. 4 shows that for the heat transfer from an oil burner to the cylinders of a hot-gas piston type motor, principally the same elements may be used as in the case of the heat transfer from the cylinders of a heat pump to a heat medium as described in accordance with FIGS. 1 to 3. One recognizes the cylinder 17 of a hot-gas piston type motor with the piston 18, the inlet 19 of the cylinder and the outlet 20 of the cylinder which is connected through a pipe 21 to the inlet 22 of an oil burner 23 having an oil supply 24. Hence, preheated combustion air is delivered to the oil burner which enhance the efficiency. The connection between the combustion space 25 of the oil burner and the cylinder 17 of the motor is realized via a circuit 26 corresponding essentially to the circuit 10 of FIG. 1 and comprising a first heat exchanger 27 with at the top, respectively at the bottom closed capillary chambers 28, respectively 29, a circulation pump and a second heat exchanger 31. The outgoing air from the cylinder 17 has a temperature of about 200°–500° C. The gas burning flame streams through the second heat exchanger 31 and heats the auxiliary medium 32, imparting to this auxiliary medium a temperature as high as possible. The quantity of heat Q is transferred into the first heat exchanger 27 with a great heat exchanging surface F by the circulation pump 30. During the compression stroke the air is compressed and heated strongly in the adjacent capillary chambers. Therefore, the pressure in the cylinder during the expansion stroke is greater than during the compression stroke so that positive work is produced which may be used for the production of electrical energy, supply of energy or for driving a heat pump.

The circuit of the auxiliary medium presents a plurality of advantages. 1. The heat exchanging system remains clean and it may be easily replaced. 2. The temperature in the heat exchanging system is high and very uniform which improves the yield of power. 3. The regulation of the temperature is particularly simplified in the case of a liquid auxiliary medium, whereby liquid metals, metal alloys, molten masses and salts may be utilized as liquid auxiliary mediums. 4. A local overheating and consequently a damaging of the heat exchanger by the burning gas flames is largely prevented, due to the fact that the walls are cooled by the auxiliary medium. Even if the auxiliary medium has a temperature of 1000° C. or higher it still has a cooling function because the gas flames are much warmer. 5. The heat exchanger is not submitted to pressure differences so that the heat exchanging surfaces may be very thin, e.g. 0.1 mm which improves the heat transfer. 6. The material of both heat exchangers can be strained until its highest limit without any risk of overstraining so that the greatest possible yield of power may be achieved.

When the installation is started from the cold condition, whereby the liquid auxiliary medium may be solidified, a preheating can be provided by means of an electrical resistance or by means of incorporated tubular pipes through which hot gases or liquids are conducted, until the auxiliary medium begins to melt.

As indicated in FIG. 4, the temperature of the auxiliary medium may be regulated in such a way by a shunting pipe 33 with corresponding control valve 34 and circulation pump 35 that no inadmissible temperatures arise. This shunting pipe is either directly provided through a heating coil 36 in the hot water tank 37 with hot water fore-running 38 or, because of the risk of steam production in the shunting pipe at high temperatures, a second auxiliary medium with heat exchanger may be provided for indirect delivery of the excess heat to the auxiliary medium. The temperatures are measured by means of a temperature measuring transducer 39 in the intermediate circuit.

Figure 5:
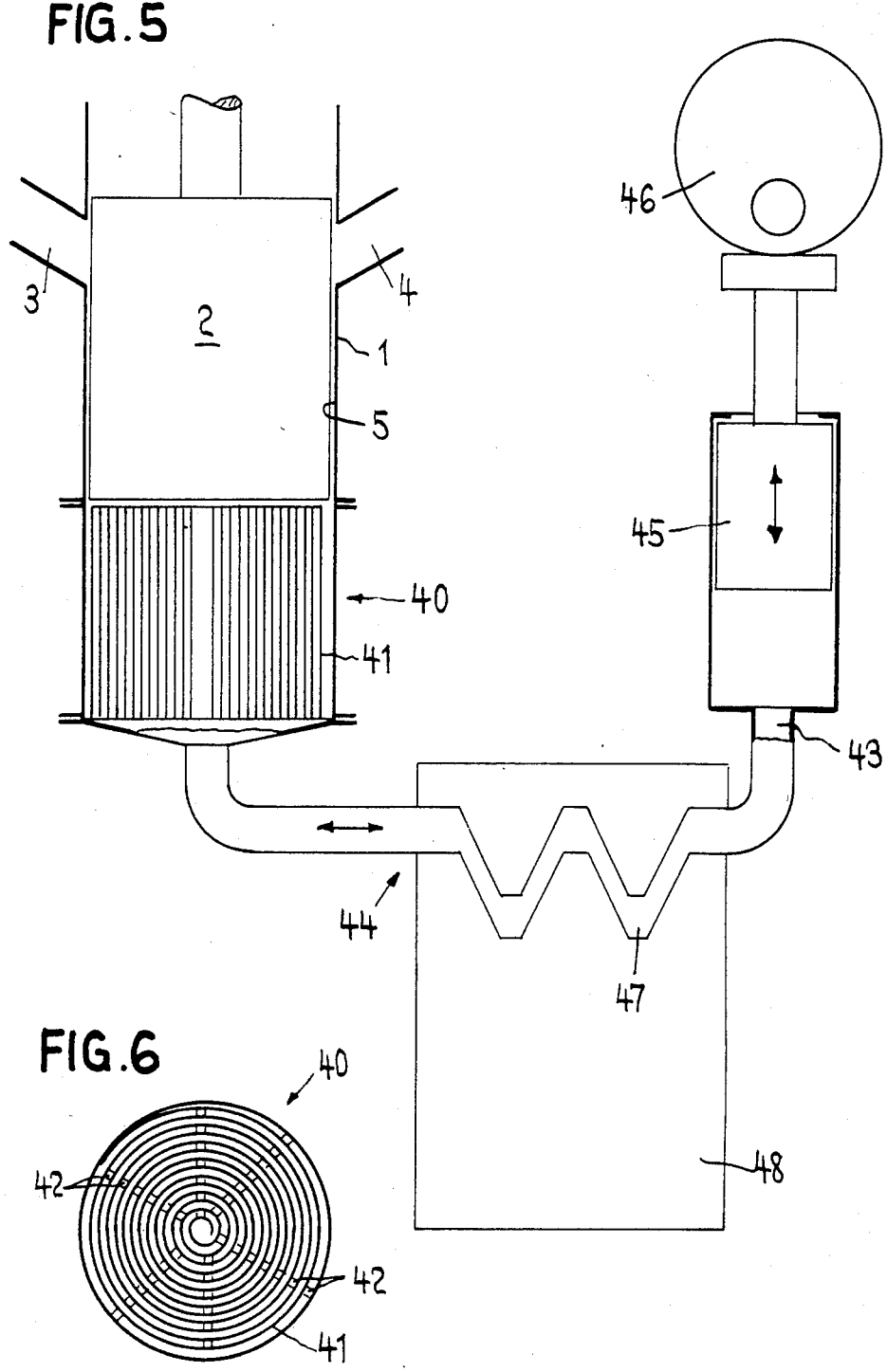
FIG. 5 shows a second embodiment according to the invention.
Figure 6:
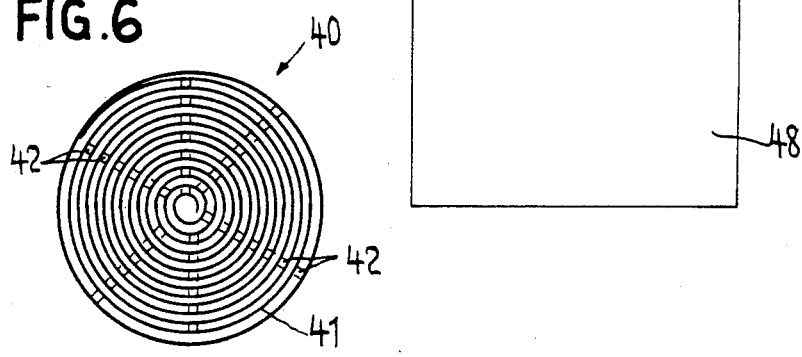
FIG. 6 shows the ground plan of the heat exchanger of FIG. 5, FIGS. 7 and 8 show variants of the embodiment of FIG. 5.

FIG. 5 shows a further example of a heat transfer system in a heat pump installation. One recognizes the cylinder 1 of the heat pump with the piston 2 as well as the inlet 3 and the outlet 4 of the cylinder and the compression space 5. The heat exchanger 40 may have the same configuration like the one of FIGS. 1 or 3 or, like in the present FIG. 5, it may consists of a capillary system of metal, e.g. of a very thin metal sheet 41 (see FIG. 6) spirally rolled with small distances and comprising like in the present example spacers 42. During the compression stroke the compressed air comes into contact from every side with this capillary system and it heats the mass of this heat exchanger. The surface may be realized practically arbitrarily as great as desired, permitting this heat exchanger to be used for storing for a short time the accepted quantity of heat Q. The piston 45 imparts to the liquid auxiliary medium 43 in the intermediate circuit 44 a pulsatory motion. The piston 45 is controlled by a driven cam 46. During the expansion stroke, in the domain of the lower dead center, the liquid auxiliary medium is pressed by the piston 45 between the metal sheets 41 of the heat exchanger 40. Hence, the auxiliary medium wets nearly the whole surface of the heat exchanger which in the upper dead center has been in contact with the compressed air. The auxiliary medium thus removes the heat from the capillary system which means that in the domain of the lower dead center, the auxiliary medium becomes warmer and that the capillary system becomes colder. During the compression stroke the auxiliary medium is again removed from the compression space. Then, the compressed and heated air in the domain of the upper dead center enters again the capillary system and delivers heat to this system. The quantity of heat Q is again stored for a short time until it is again removed by the auxiliary medium. During its backward and forward motion the auxiliary medium passes within a second heat exchanger 47 in which the quantity of heat Q is delivered from the auxiliary medium to the heat medium 48.

Figure 7:
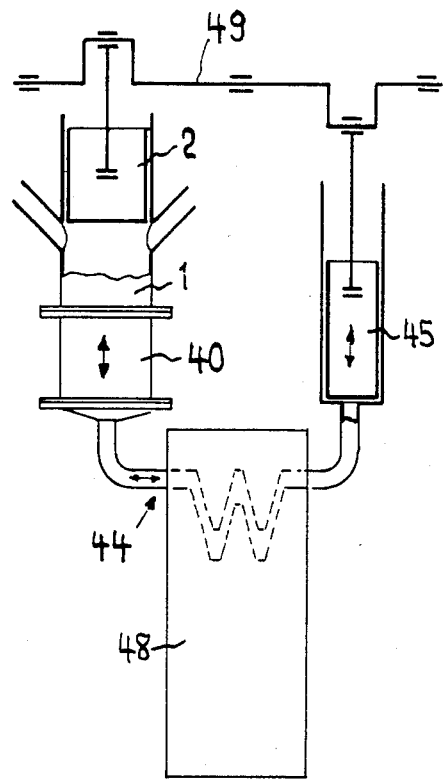
Figure 8:
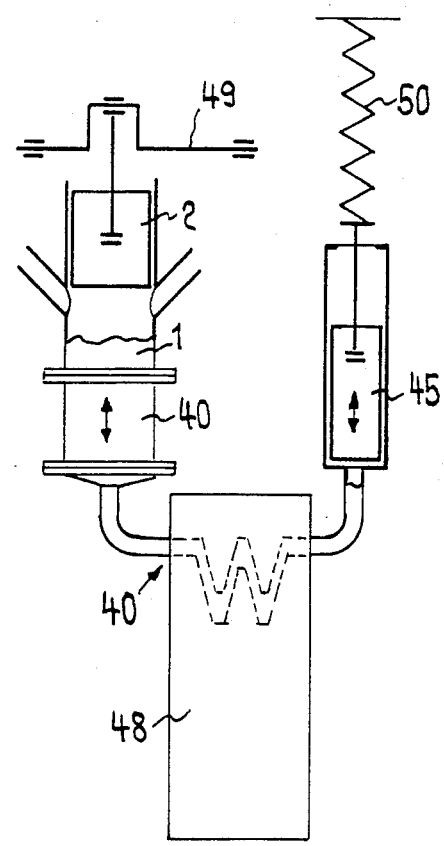

In FIGS. 7 and 8 two variants regarding the driving of the piston 45 in the intermediate circuit are described. The piston 45 which sets the auxiliary medium into circulation is driven by the crankshaft 49 of the heat pump in opposite or nearly opposite direction with respect to the movement of the piston of the heat pump.

In FIG. 8, the piston 45 which sets the auxiliary medium into circulation is moved by spring pressure and the stroke is limited. During the compression stroke the auxiliary medium is brought out of the compression space of the heat pump by the pressure of the compressed air against the corresponding adjusted spring pressure of the spring 50 and it is again re-introduced in the heat exchanger in the domain of the lower dead center. The auxiliary medium is in any case a liquid with a sufficiently high evaporating or boiling point, the liquid having no disturbing influence on the air and on the motion of the piston in the heat pump. Furthermore, the liquid must not or nearly not wet the material of the heat exchanger for not hindering the transmission of heat between the compressed air and the heat exchanger and avoiding strong capillary forces during the circulation of the liquid when metals, metallic alloys, silicon fluid and water or aqueous solutions are utilized.

Figure 9:
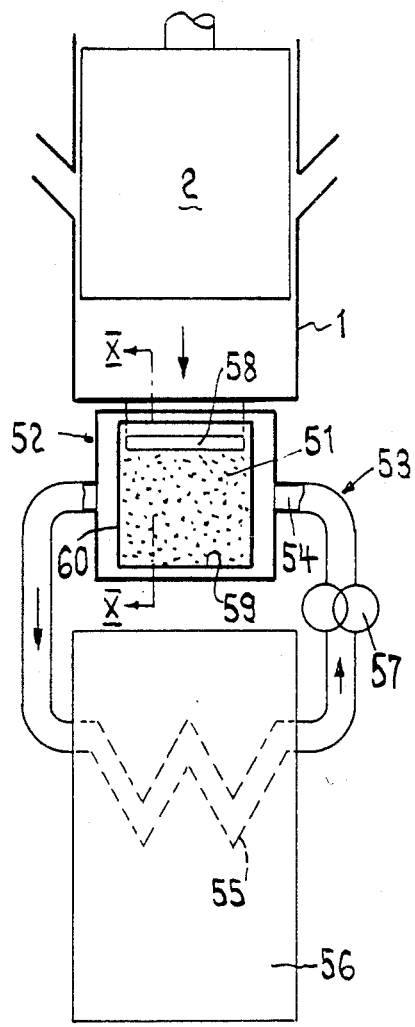
FIG. 9 shows a third embodiment of a heat transfer system.
Figure 10:
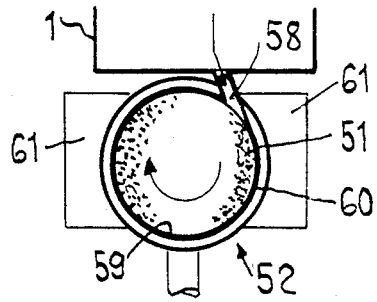
FIG. 10 shows a section along the line X—X of FIG. 9.

In the embodiment of FIGS. 9 and 10 the necessary great surface in the first heat exchanger is not realized with a capillary system consisting of metal sheets but by the utilization of iron filings 51 which is represented schematically. Also in this case, the first heat exchanger 52 with the intermediate circuit 53 comprising a liquid medium 54, the second heat exchanger 55 and the heat medium 56 and the circulation pump 57 is arranged below the cylinder 1 of the heat pump. During the compression stroke the heated air is pressed through a tangential slit 58 into a cylindrical compression space 59. In the compression space is a quantity of iron filings, the surface and the fineness of which being sufficient for permitting the transmission of the quantity of heat Q from the air to the iron fillings. Up to the upper dead center the air with the iron fillings in the compression space is submitted to strong whirling. This induces the air to deliver heat to the iron filings and as far as possible also to the wall 60 of the inner and outer webbed or ribbed compression space. At the time when the piston of the heat pump is in the upper dead center, the magnets 61 are switched on so that the iron filings comes to adhere to the wall 60 of the compression space. This produces on the one hand that during the expansion stroke the iron fillings are prevented to enter within the cylinder when the air from the compression space expands in the cylinder and on the other hand that the iron filings may deliver its heat directly to the wall of the compression space and from this wall to the auxiliary medium. The compression space is surrounded by the auxiliary medium 54 which delivers the received quantity of heat Q through the second heat exchanger 55 to the heat medium 56.

Figure 11:
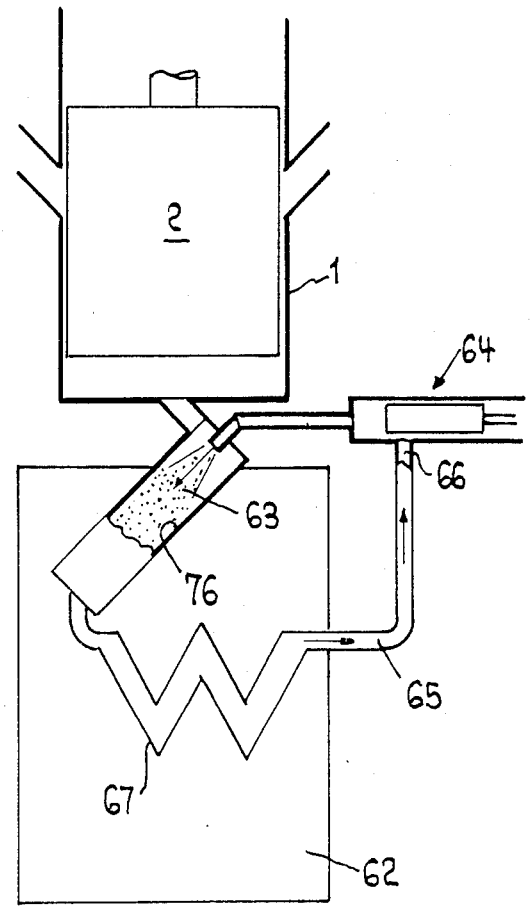
FIG. 11 shows a fourth embodiment of a heat transfer system.

In FIG. 11 is represented a further embodiment of the invention for delivering heat from the cylinder 1 of a heat pump to the heat medium 62. The necessary great surface is produced in this case by means of a very fine fog schematically indicated by 63 and consisting of fine droplets. This fog is produced in that at the time at which the piston 2 is in the upper dead center the liquid auxiliary medium 66 streaming in the intermediate circulator 65 is injected into the compression space 76 by means of an injection pump similar to the one of a Diesel engine. The fine droplets of the fog are heated by the admitted heated air and condenses after the absorption of heat on the walls of the compression space. Then, the accumulated liquid auxiliary medium in the compression space heats the heat medium 62 through a second heat exchanger 67.

It is also possible to make use of a similar compression space as in FIG. 5 which permits also a light separation of the injected auxiliary medium and an increase of the surface which is necessary for the transmission of heat. Moreover, as already indicated, this capillary system permits to store the heat up to the delivery of the heat from the liquid auxiliary medium to the heat medium through the second heat exchanger.

Figure 12:
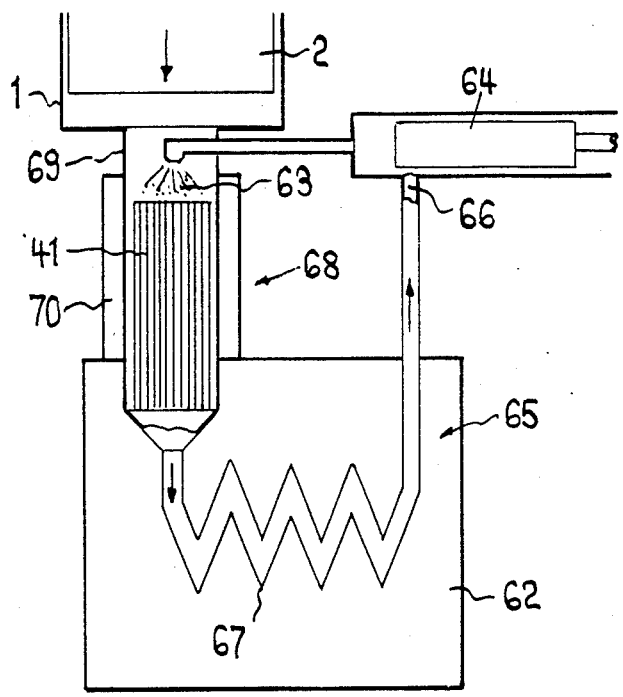
FIG. 12 shows a fifth embodiment of a heat transfer system.

In the embodiment of FIG. 12 in which also a liquid is sprayed, the compression space which acts as a heat exchanger 68 is connected through a channel 69 with the cylinder 1 of the heat pump or it may be directly fixed to the cover of the cylinder. Through the indicated combination of a capillary system 41, 42 like the one of the embodiment of FIGS. 5 and 6 with the injection system 63 and 64 according to FIG. 11 it is possible to obtain a nearly unlimited great surface. Due to the fact that the capillary system is used as a short time heat accumulator it is necessary to surround this capillary system with a heat insulating jacket 70.

Figure 13:
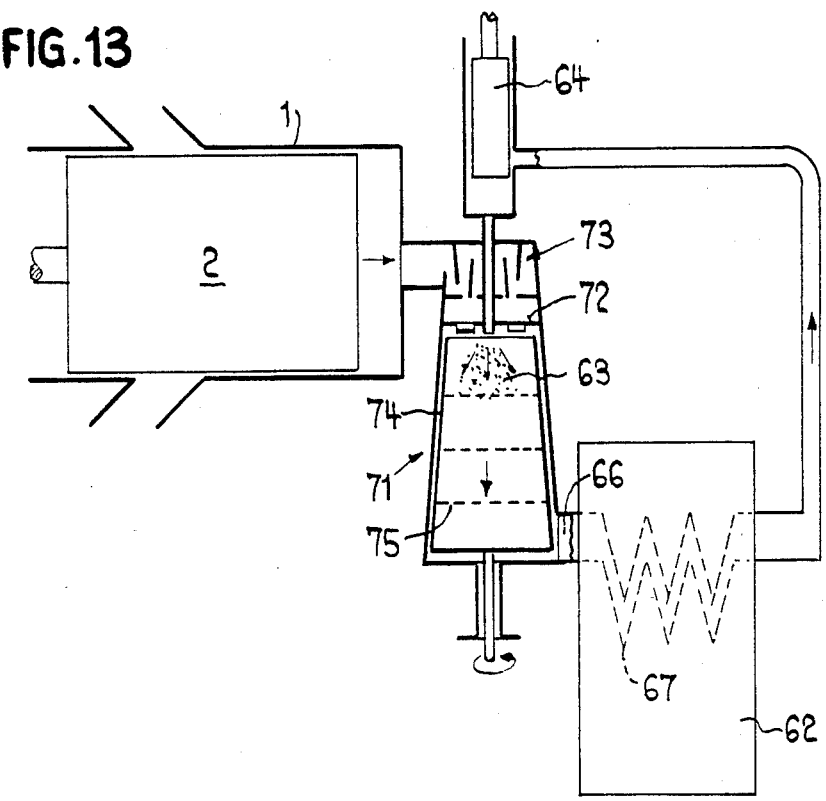
FIG. 13 shows a sixth embodiment of a heat transfer system.

FIG. 13 shows a further embodiment of a heat transmission system with injection in which the cylinder 1 of the heat pump is arranged horizontally, the same elements like the injection pump, the injection nozzle, the second heat exchanger and the heat medium having the same designations as in FIGS. 11 and 12. Between the cylinder of the heat pump and the first heat exchanger 71 acting as a compression space, twisting sheets 72 are arranged which impart an impetuous rotation to the air entering into the compression space, respectively to this air before its leaving of the compression space. This produces on the one hand an increase of the heat transfer to the fog of droplets 63 due to the violent whirling of the air and on the other hand it is possible, by means of a cyclone separator 73, to practically avoid completly that the liquid auxiliary medium 66 enters into the heat pump during the expansion stroke. This is further enhanced by a quick rotating tumbler 74 with openings 75 disposed in the compression space, respectively in the first heat exchanger 71 and acting as a centrifuge in which the perforated walls act as baffle plates.

Figure 14:
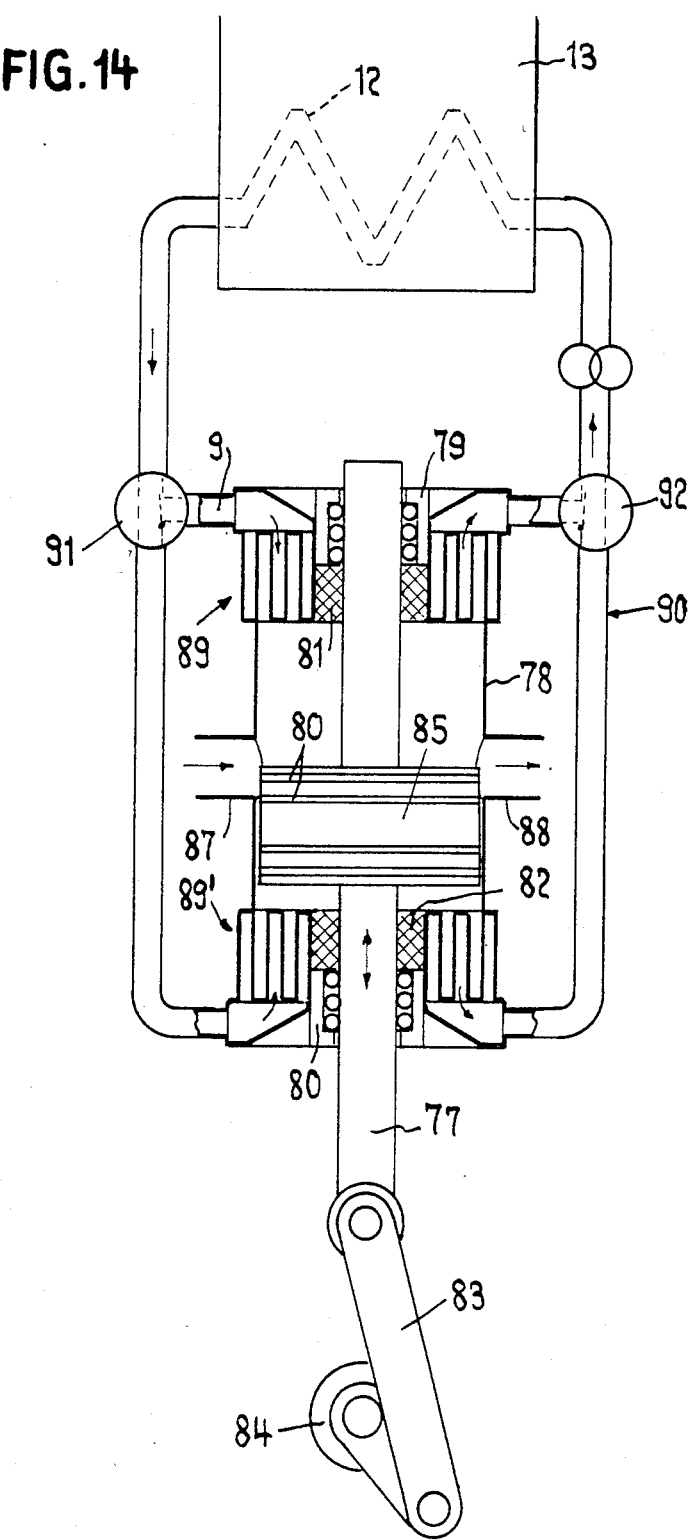
FIG. 14 shows a further embodiment with a double action heat pump.

FIG. 14 shows a further embodiment in which the efficiency of the heat transfer is increased due to the fact that the heat pump is conceived to operate in both directions. The through passing piston rod 77 is guided at the top and at the bottom of the cylinder 78 by ball bearings 79 and 80. The piston rod is stuffed above and below by labyrinth boxes 81 and 82. The inferior ball bearing guide 80 acts as a cross head guide of the piston rod which is connected to the crankshaft 84 of the drive of the heat pump by the connecting rod 83. The piston 85 and the piston rod do not come into contact either with the wall of the cylinder or with the cover of the cylinder. The stuffing of the piston is not provided by piston rings but by a labyrinth box 86. This arrangement permits to reduce the mechanical losses to less than 10% of the necessary driving power of the heat pump. One recognize further the inlet 87 of the cylinder and the outlet 88 of this cylinder. The first heat exchanger is separated in an upper part 89 and a lower part 89', the construction of these parts being the same as the one of the embodiments according to FIGS. 1 to 4. The auxiliary medium 9 controlled by the valves 91 and 91 circulates into an intermediate circuit 90 and it takes up the heat alternatively from the upper and the lower first heat exchanger and transmits it to the second heat exchanger 12 which in its turn delivers its heat to the heat medium or industrial water 13.

It is also possible to conveive the first separated heat exchanger like the ones of the other examples.

I claim:

1. A hot-gas piston type engine comprising a first heat exchanger constructed to act as a compression space of a cylinder of said engine, an intermediate circuit containing an auxiliary medium, and a second heat exchanger cooperating with a heat medium, said first heat exchanger, said intermediate circuit and said second heat exchanger being connected in series whereby heat may be efficiently transferred between said heat medium and said compression space of said cylinder, said first heat exchanger including annular, concentric capillary chambers which, viewed from an underneath disposed cylinder, are alternatively open at the top and at the bottom, the air coming out of the cylinder flowing into the capillary chambers open at the bottom and the auxiliary medium circulated by a circulation pump flowing through the capillary chambers open at the top.

2. An engine according to claim 1, wherein said capillary chambers consist of thin rings of metal sheets having impressed bosses and reciprocally supporting each other.

3. Utilization of the engine according to claims 1 or 2 as a heat pump, wherein the heat received by the auxiliary medium in the first heat exchanger is delivered within the second heat exchanger to water for industrial use.

4. Hot-gas piston type engine according to one of the claims 1 or 2, wherein said second heat exchanger protrudes within the burning space of an oil burner, the outlet of the cylinder being connected with the inlet of the oil burner.

5. An engine according to claim 4, wherein a shunting pipe with a control valve and a circulation pump is connected across the intermediate circuit such that a controllable portion of said auxiliary medium bypasses said first heat exchanger.

6. A hot-gas piston type engine according to one of the claims 1 or 2, in the form of a heat pump comprising a piston adapted to reciprocate in both directions in said cylinder, said piston being coupled to a through passing piston rod which is guided above and below the piston by ball bearings and stuffed above and below by labyrinth boxes, said first heat exchanger having upper and lower portions respectively disposed adjacent said labyrinth boxes.

7. Hot-gas piston type engine according to claim 1, wherein the auxiliary medium is gaseous.

8. An engine according to claim 1, wherein the auxiliary medium is a liquid.

9. An engine according to claim 8, wherein said liquid auxiliary medium is an aqueous solution or a salt, a molten mass, or a liquid metal or a metallic alloy.

10. A hot-gas piston type engine comprising a first heat exchanger constructed to act as a compression space of a cylinder of said engine, an intermediate circuit containing an auxiliary medium, and a second heat exchanger cooperating with a heat medium, said first heat exchanger, said intermediate circuit and said second heat exchanger being connected in series whereby heat may be efficiently transferred between said heat medium and said compression space of said cylinder, said second heat exchanger protruding within the burning space of an oil burner, the outlet of said cylinder being connected with the inlet of said oil burner.

11. A hot-gas piston type engine comprising a first heat exchanger constructed to act as a compression space of a cylinder of said engine, an intermediate circuit containing an auxiliary medium, and a second heat exchanger cooperating with a heat medium, said first heat exchanger, said intermediate circuit and said second heat exchanger being connected in series whereby heat may be efficiently transferred between said heat medium and said compression space of said cylinder, said engine being in the form of a heat pump having a piston adapted to reciprocate in both directions in said cylinder, said piston being coupled to a through passing piston rod which is guided above and below the piston by ball bearings and stuffed above and below by labyrinth boxes, said first heat exchanger having upper and lower portions respectively disposed adjacent said labyrinth boxes.

* * * * *